E. P. WANNER.
SCREW DRIVING MACHINE.
APPLICATION FILED FEB. 23, 1907.
922,221.
Patented May 18, 1909.
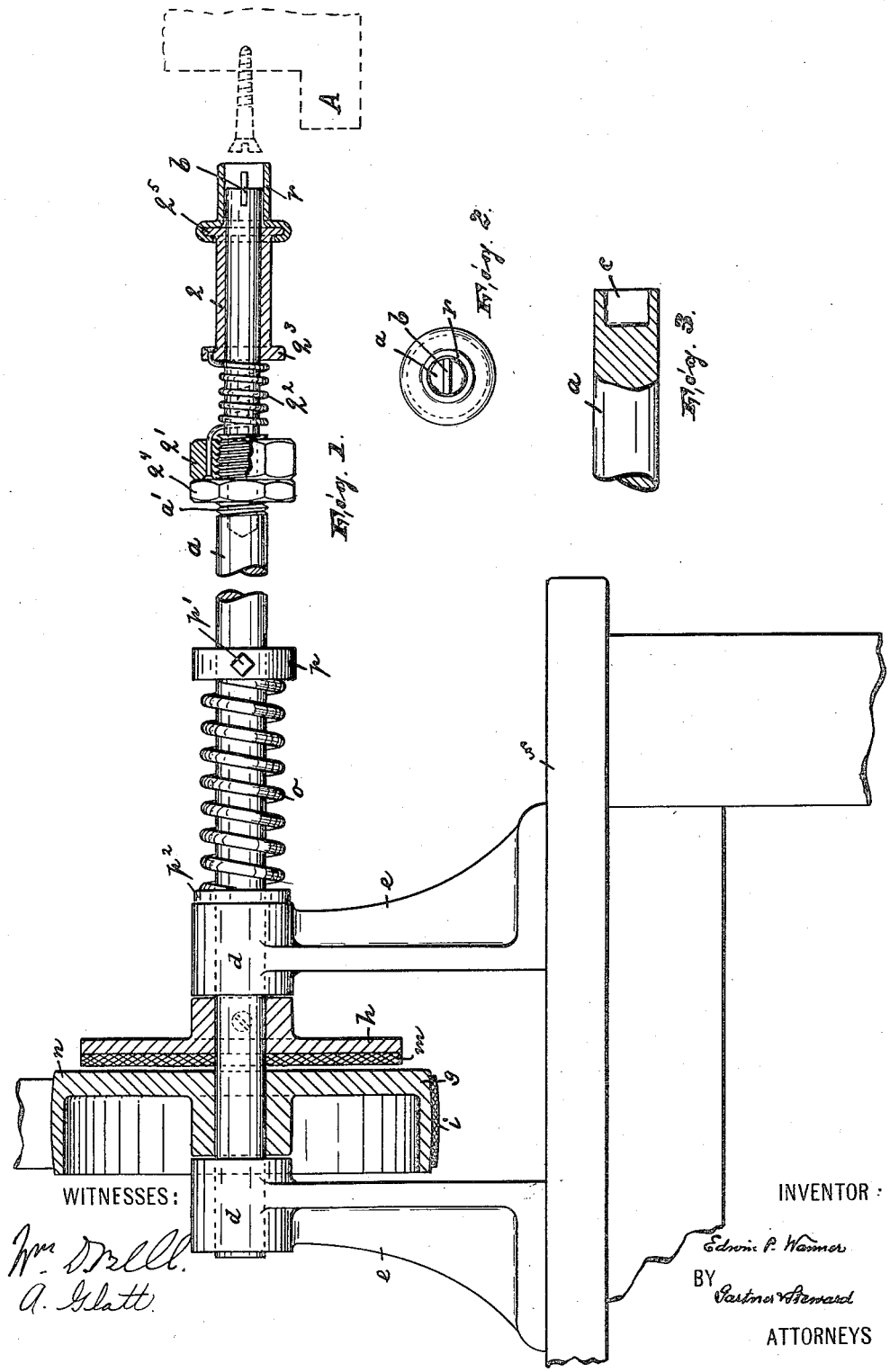

UNITED STATES PATENT OFFICE.

EDWIN P. WANNER, OF NEW YORK, N. Y.

SCREW-DRIVING MACHINE.

No. 922,221.   Specification of Letters Patent.   Patented May 18, 1909.

Application filed February 23, 1907. Serial No. 358,929.

*To all whom it may concern:*

Be it known that I, EDWIN P. WANNER, a citizen of the United States, residing in New York city, county, and State of New York, have invented certain new and useful Improvements in Screw-Driving Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in power driven machinery by which screws or bolts may be driven or forced into furniture or other kinds of woodwork.

The object of the invention is to provide a simple and efficient machine for driving screws or bolts into parts of furniture or the like; make provisions for automatically bringing the active elements into operation by presenting the work to the machine, and to allow the easy and proper introduction of the screws or bolts to the driver spindle, and finally to provide means for adjusting the screw or bolt-guiding ferrule upon the driver spindle and further to prevent the marring and defacing of the wood when the screw or bolt is being driven home.

The invention consists in the automatically operated screw or bolt driving machine, in the adjustable means for engaging a screw nick and for keeping the screw in position relative to the spindle, and in the combination and arrangement of the various parts, substantially as will be herein more fully described and finally embodied in the clauses of the claim.

Referring to the accompanying drawings in which like letters of reference indicate corresponding parts in each of the several figures; Figure 1 is a sectional view of a screw or bolt-driving machine embodying the features of this invention; Fig. 2 an end elevation of the driver spindle and its surrounding ferrule; and, Fig. 3 an enlarged detail view partly in section of the modified form of driver spindle adapted to receive the squared or angular head of a bolt.

In the drawings, $a$ represents a screw or bolt holder, in the form of an elongated spindle, having means for the reception of a screw or bolt in a manner to impart rotary movement thereto. In Fig. 1 said means are represented by a nick engaging plate $b$, while in Fig. 3 said holder $a$ is provided with a polygonal or angular socket $c$, adapted to receive the polygonal or angular head of a lag-bolt, as will be manifest. The spindle $a$ may be of any desired length, and is mounted in suitable bearings $d$, $d$ on standards $e$, $e$ which may be erected on a bed or table $f$ of any suitable shape or construction.

The spindle $a$, in the present embodiment of the invention, is adapted for rotary and endwise movement, and with said spindle is operatively combined a driving mechanism which includes active and idle members, said members arranged to be brought automatically into service on the presentation of the work to the driver spindle. This driver mechanism may be of any suitable construction, but as shown, the active member thereof is in the form of a pulley $g$, while the idle member is a clutch $h$. The active member $g$ is loosely mounted on the spindle $a$ at a point between the bearings $d$, $d$ and around said member or pulley $g$ is arranged the driving belt $i$, which may be propelled from an overhead shaft or any other suitable mechanism.

The idle member or clutch $h$ is securely mounted on the spindle $a$ and is equipped with a clutch or friction face-plate $m$, adapted to engage the active face $n$ of the pulley $g$. The clutch or friction face plate $m$ may be a layer of any suitable material applied to or secured on that face of the clutch disk which lies adjacent to the active face $n$ of the pulley $g$, and this member or clutch disk is mounted on the spindle $a$ to partake of the endwise adjustment thereof, thus disposing the member $h$ for engagement with the running active member when an endwise movement is given to the spindle $a$, by applying pressure through the work against the said spindle. The clutch disk or idle member is normally held out of engagement with the running active member by a suitable retractor, which is represented as a spiral spring $o$ coiled loosely around the spindle $a$, and having one end seated against a collar $p$, which is adjustably secured on the spindle by means of a set screw $p'$. The other end of said retracting spring is seated against a washer $p^2$, having engagement with one of the bearings $d$, whereby the said spiral spring $o$ normally pushes against the collar $p$ to move the spindle in a forward direction and thus maintain the idle member or disk $h$ in a laterally spaced relation to the running active member g of the driving mechanism, as clearly shown in Fig. 1 of the drawings.

On the operative end of the spindle a is yieldingly arranged a sleeve q carried by and connected with the nut q' by means of a spiral spring $q^2$, surrounding the spindle a, and secured with one end to the flange $q^3$ of the sleeve q and with its other end to the nut q'. Said nut is adjustably mounted on the screw threaded portion a' of the spindle a, and is locked in its adjusted position by means of the auxiliary nut $q^4$. The outer end of the sleeve q is also provided with an annular flange $q^5$ on which is revolubly mounted a guide ferrule r, surrounding the end portion of the spindle a and projecting beyond the latter and beyond the nick plate b.

In operation, the spiral spring o presses the spindle a endwise to a position where the idle member h is free from engagement with the running member g. The operator places the headed end of the screw into the ferrule r so that the screw will be guided by the said ferrule to a position where the nick plate b of the spindle will enter the nick in the screw head, and, meanwhile holding the screw with his hand, he brings the work A (indicated by dotted line in Fig. 1) up to the screw and causes the work to press against the screw and thus force the spindle a back—against the action of the spiral spring o—until the face-plate comes against the pulley, whereupon rotary movement is imparted to said spindle thus driving the screw into the work. As the operation of driving in the screw is about to be completed the ferrule r comes against the work and yields rearwardly, together with the sleeve q—against the action of the spiral spring $q^2$, but as the said ferrule r is revolubly mounted on said sleeve q, the latter rotates while the ferrule stands still and bears against the work without marring or defacing the same. It being obvious that a soft wood would be marred by the ferrule r more easily than a hard wood, the adjustment afforded by the nut q' makes it possible to set the ferrule back so that it will only be bearing against the wood during the very last part of the operation of driving the screw; and the wood being soft, so that the screw enters the same comparatively freely at the start, one can afford to set the ferrule back in this manner without detracting from its action as a guide for the screw. Of course it will be understood that according to the hardness of the wood so the sleeve g must be adjusted to give more or less guiding capacity to the ferrule r.

Having thus fully described my invention, what I claim as new and desire to secure by Letters Patent is:

A screw or bolt driving machine having a screw or bolt holder, said holder being externally threaded, a nut screwed onto the threaded portion of said holder and adjustable thereon, a lock-nut also screwed onto said threaded portion in contact with said first-named nut, means for rotating the holder automatically when pressure is applied thereto, a yielding sleeve rotating with said holder, a spiral spring coiled about said holder and having one end fixed in the first-named nut and the other end in the sleeve, and a screw-guiding ferrule revolubly mounted on said sleeve, substantially as described.

In testimony, that I claim the foregoing, I have hereunto set my hand this fourth day of February 1907.

EDWIN P. WANNER.

Witnesses:
ALFRED GARTNER,
J. D. SMITH.